United States Patent
Fischer et al.

(10) Patent No.: US 6,857,791 B2
(45) Date of Patent: Feb. 22, 2005

(54) OPTICAL DEVICE ASSEMBLY WITH AN ANTI-KINK PROTECTOR AND TRANSMITTING/RECEIVING MODULE

(75) Inventors: Uwe Fischer, Berlin (DE); Mario Festag, Berlin (DE); Andreas Steffensen, Kleinmachnow (DE)

(73) Assignee: Infineon Technologies AG, Munich (DE)

( * ) Notice: Subject to any disclaimer, the term of this patent is extended or adjusted under 35 U.S.C. 154(b) by 396 days.

(21) Appl. No.: 10/023,139

(22) Filed: Dec. 18, 2001

(65) Prior Publication Data

US 2002/0085818 A1 Jul. 4, 2002

(30) Foreign Application Priority Data

Dec. 18, 2000 (DE) .......................................... 100 64 601

(51) Int. Cl.[7] .............................. G02B 6/42; G02B 6/00

(52) U.S. Cl. .......................................... 385/92; 385/147

(58) Field of Search ...................... 385/88, 92, 100–114

(56) References Cited

U.S. PATENT DOCUMENTS 6,366,380 B1 * 4/2002 Chesavage .................. 398/117

FOREIGN PATENT DOCUMENTS

DE           30 43 613 A1      5/1981

* cited by examiner

Primary Examiner—F. L. Evans
(74) Attorney, Agent, or Firm—Laurence A. Greenberg; Werner H. Stemer; Gregory L. Mayback

(57) ABSTRACT

An optical device assembly includes an optical device. The optical device has an optical fiber led from the device with an anti-kink protector, and also a transmitting and/or receiving module having such an optical device. The anti-kink protector is made of a material and/or the anti-kink protector is sheathed with a material that is electrically conductive or highly absorbent to electromagnetic waves. The transmitting and/or receiving module is constructed in such a way that the anti-kink protector is disposed in the area of an opening of the module housing and at the same time is coupled electrically to the module housing. The electrical coupling of the electrically conductive anti-kink protector to the module housing results in a considerable reduction in the interference radiation that emerges.

50 Claims, 6 Drawing Sheets

Prior Art

OPTICAL DEVICE ASSEMBLY WITH AN ANTI-KINK PROTECTOR AND TRANSMITTING/RECEIVING MODULE

BACKGROUND OF THE INVENTION

Field of the Invention

The invention relates to an optical device having an optical fiber led from the optical device with an anti-kink protector for the optical fiber placed in the area where the optical fiber leaves the optical device. The invention also relates to a transmitting and/or receiving module having at least one such optical device. The invention is suitable in particular for the implementation of a fiber leadthrough suitable for EMI with an anti-kink protective function.

The prior art shows optical fibers with an anti-kink protector in the area where they are led into or led from an optical device, for example a TO (transistor outline) housing or an optical connector. Such a solution includes a conical support sleeve made of plastic that guides the optical fiber. In particular, it is known to use such an anti-kink protector when coupling components with which fast optical data transmission is conducted, in particular in the GHz band.

A first example of this is the use of anti-kink protective sleeves on TO housings for optical transmitters and optical receivers of pigtail construction, as it is known. TO housings are standard housings, known in the prior art, for optical transmitters or optical receivers whose form resembles the housing of a (classical) transistor but which have a glass window on the top for the entry and exit of light. The optical transmitter normally used is a laser diode, and the optical receiver is a PIN diode with preamplifier.

An example of such a TO housing of pigtail construction is illustrated schematically in FIG. 3. A TO housing 1 accommodates a transmitting or receiving device 11 and, in order to make electrical contact with it, has electric feed lines 2. An optical fiber 3 is led to the TO housing 1 via a cylindrical metallic adapter 4. Into the cylindrical metallic adapter 4, the fiber 3 is centrally, adhesively bonded. A tapering fiber anti-kink protector 5 adjoining the adapter 4 ensures that the optical fiber 3 is not kinked too sharply and is protected against mechanical loading.

Such TO housings of pigtail construction are normally disposed in a metallic housing of an optical transmitting and receiving module. In order to guide the optical fiber from the metallic housing, the latter has an outlet opening for the fiber leadthrough. For the GHz band considered, such outlet openings disadvantageously constitute discontinuities that generate undesired interference radiation.

A second example relates to the use of an anti-kink protector on an optical connector. An optical connector generally has a plastic housing, to which an optical fiber is led via an anti-kink protector. The actual connector has metallic elements in this case which, at high clock frequencies, likewise lead to undesired interference radiation or act as an antenna.

SUMMARY OF THE INVENTION

It is accordingly an object of the invention to provide a optical device assembly with an anti-kink protector and transmitting/receiving module that overcomes the hereinafore-mentioned disadvantages of the heretofore-known devices of this general type and that provide an optical device having at least one optical fiber led out of the device, and also a transmitting and/or receiving module, which have improved high-frequency properties, in particular reduced electromagnetic interference emissions.

With the foregoing and other objects in view, there is provided, in accordance with the invention, an optical device assembly. The assembly includes an optical device having an area. An optical fiber is led from the optical device through the area. An anti-kink protector for the optical fiber is disposed in the area and made of an electrically conductive material.

With the objects of the invention in view, there is also provided an optical device assembly. The assembly includes an optical device having an area. An optical fiber is led from the optical device through the area. An anti-kink protector for the optical fiber is disposed in the area and made of a material being highly absorbent to electromagnetic waves.

With the objects of the invention in view, there is also provided a further embodiment of an optical device assembly. The assembly includes an optical device having an area. An optical fiber is led from the optical device through the area. An anti-kink protector for the optical fiber is disposed in the area (21) and sheathed with an electrically conductive material (9).

With the objects of the invention in view, there is also provided a further embodiment of an optical device assembly. The assembly includes an optical device having an area. An optical fiber is led from the optical device through the area. An anti-kink protector for the optical fiber is disposed in the area and sheathed with a sleeve being made of a material being highly absorbent to electromagnetic waves.

With the objects of the invention in view, there is also provided a module for transmitting and/or receiving. The module includes a metallic module housing having an opening for passing optical fibers therethrough. The module then includes an optical device according to the invention. The anti-kink protector of the optical device is disposed in the opening of the module housing and coupled electrically to the module housing.

Accordingly, the anti-kink protector includes a material that is electrically conductive or highly absorbent to electromagnetic waves. Alternatively or additionally, the anti-kink protector is sheathed with such a material. The use of an electrically conductive material or a material that is highly absorbent to electromagnetic waves leads to the anti-kink protector making a contribution to the electromagnetic shielding, and therefore the production and propagation of interference radiation being reduced.

Including an electrically conductive material for the anti-kink protector or its sheathing substantially reduces the emitted interference radiation substantially follows. Bringing the conductivity of the material to the electric potential of a reference potential reduces the emitted interferences. In this case, the electrically conductive anti-kink protector can be connected firstly to a TO housing and secondly to a metallic module housing. The electric potential of the TO housing is brought to the electric potential of the module housing on the shortest path via the conductive anti-kink protector.

If a highly absorbent material is used, the improved shielding effect is substantially based on the fact that electromagnetic radiation is absorbed in the absorbent material, that is to say is converted into heat. The highly absorbent material in this case preferably exhibits an attenuation of at least −0.5 dB/cm, preferably of at least −3 dB/cm, particularly preferably of at least −10 dB/cm.

The two effects also can be combined. For instance, within the scope of the invention, a fiber anti-kink protector made of an absorbent material can be combined with a sheathing made of an electrically conductive material.

In a preferred embodiment of the invention, the anti-kink protector or the sheathing includes an electrically conductive material, and the latter is in electrical contact with at least one metallic structure of the device. In this case, this is, for example, a metallic housing to accommodate opto-electronic components, in particular a TO housing. The anti-kink protector or the sheathing is in this case electrically connected to the TO housing. This can be carried out directly or else via conductive intermediate elements such as a metallic adapter.

This refinement is particularly advantageous if the anti-kink protector or the sheathing is additionally connected to a reference potential, in particular coupled electrically to a module housing surrounding the metallic housing and its opto-electronic components. Coupling of this type to a module housing is carried out in the area of the outlet opening of the module housing, in which the anti-kink protector device is disposed. By this configuration, the corresponding outlet opening of the module housing is effectively shielded. Interference radiation produced in the interior of the module housing is able to leave the outlet openings only to a sharply reduced extent, because of their coupling with the conductively constructed anti-kink protective sleeve, or is prevented from being produced.

For improved fixing of the anti-kink protector or the sheathing at the opening of the metallic housing, the anti-kink protector or the sheathing preferably have circumferential grooves in the appropriate area. The rim of the opening of the metallic housing engages in these grooves to be specific preferably in such a way that the anti-kink protector or the sheathing is pressed in somewhat to make reliable electric contact.

If a sheathing of electrically conductive material is used, this preferably sheathes at least the tapering area of the anti-kink protector. This sheathing achieves a so-called chimney effect, that is, electromagnetic radiation running within the anti-kink protector decreases within this chimney formed by the conductive material. The cutoff frequency is therefore increased. Of course, the chimney function is the more marked the longer and the narrower in diameter the construction of the electrically conductive part of the sheathing or the chimney.

The electrically conductive anti-kink protector preferably includes an electrically conductive material. To this end, it is known, for example, to provide nonconductive elastomers homogeneously with conductive filler particles, for example to add small silver-encapsulated spheres to the elastomers. A sheathing can likewise include a material filled homogeneously with conductive filler particles. In addition, the sheathing can be coated with a metallic material. The coating can be manufactured by an electroplating deposition process or else via metal evaporation. It is also conceivable to sheathe a plastic anti-kink protective sleeve with a fine wire braid.

The conductive material used for the anti-kink protector or the sheathing is preferably highly conductive, that is to say its resistance lies in the range of a few ohms. By using such a material, particularly good shielding effects are achieved.

As already discussed during the explanation of the basic idea of the invention, the anti-kink protective sleeve or the sheathing can also include an absorbent material, which usually has no or only a low conductivity. Because of the low conductivity, there is no risk that the anti-kink protector itself serves undesirably as an antenna. This risk exists in particular in application variants in which the anti-kink protector is not connected to a ground potential, but projects freely out of the associated optical device, as is usually the case in optical connectors, for example. In order to form a highly absorbent material, for example a ferritic material is added to the anti-kink protector material.

The transmitting and/or receiving module according to the invention has at least one optical device as described herein, which is configured as a transmitting device and/or receiving device and has an electrically conductive module housing. The anti-kink protector of the optical device in each case is disposed in the area of an opening of the module housing and coupled electrically to the module housing.

In this case, the anti-kink protector preferably provides electrical coupling between metallic structures belonging to the transmitting and/or receiving device and the module housing. As a result, interference potentials produced during the operation of the transmitting and/or receiving device are dissipated directly to the metallic housing.

In accordance with another feature of the invention, the anti-kink protector can have a tapering area. An electrically conductive sleeve then sheathes the anti-kink protector at least in the tapering area.

In accordance with another feature of the invention, an optical device assembly includes an optical device, an optical fiber, and an anti-kink protector. The optical device has an area. The optical fiber is led from the optical device through the area. The anti-kink protector for the optical fiber is disposed in the area and is made of a material that is highly absorbent to electromagnetic waves.

In accordance with another feature of the invention, the anti-kink protector has a tapering area. An electrically conductive sleeve then sheathes the anti-kink protector at least in the tapering area.

In accordance with another feature of the invention, a ferritic material is used as the material that is highly absorbent, to electromagnetic waves.

In accordance with another feature of the invention, the optical device is an optical connector. The material of the anti-kink protector may be highly absorbent to electromagnetic waves, and therefore, absorbs electromagnetic waves strongly.

In accordance with another feature of the invention, the anti-kink protector is made of an electrically conductive material.

In accordance with another feature of the invention, the optical device is an optical connector. The anti-kink protector may then be formed by a material strongly absorbing electromagnetic waves.

In accordance with another feature of the invention, the anti-kink protector is made of an electrically conductive material. The anti-kink protector and the sleeve electrically then contact a reference potential.

In accordance with another feature of the invention, the anti-kink protector has a tapering area. The sleeve is made of and electrically conductive material and sheathes the anti-kink protector at least in the tapering area.

In accordance with another feature of the invention, a module includes a metallic module housing and an optical device assembly. The metallic module housing has an opening for passing optical fibers therethrough. The optical device assembly includes an optical device having an area, an optical fiber led from the optical device through the area, and an anti-kink protector for the optical fiber. The anti-kink protector is disposed in the area and made of a material being highly absorbent to electromagnetic waves. The anti-kink protector of the device is disposed in the opening of the module housing and coupled electrically to the module housing.

In accordance with another feature of the invention, a module includes a metallic module housing and an optical device. The metallic module housing has an opening for passing Optical fibers therethrough. The optical device assembly includes an optical device having an area. An optical fiber is led out of the optic:al device through the area. An anti-kink protector for the optical fiber is disposed in the area and sheathed with a sleeve being made of a material being highly absorbent to electromagnetic waves. The anti-kink protector of the device is disposed in the opening of the module housing arid coupled electrically to the module housing.

Other features which are considered as characteristic for the invention are set forth in the appended claims.

Although the invention is illustrated and described herein as embodied in a optical device with an anti-kink protector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 3:
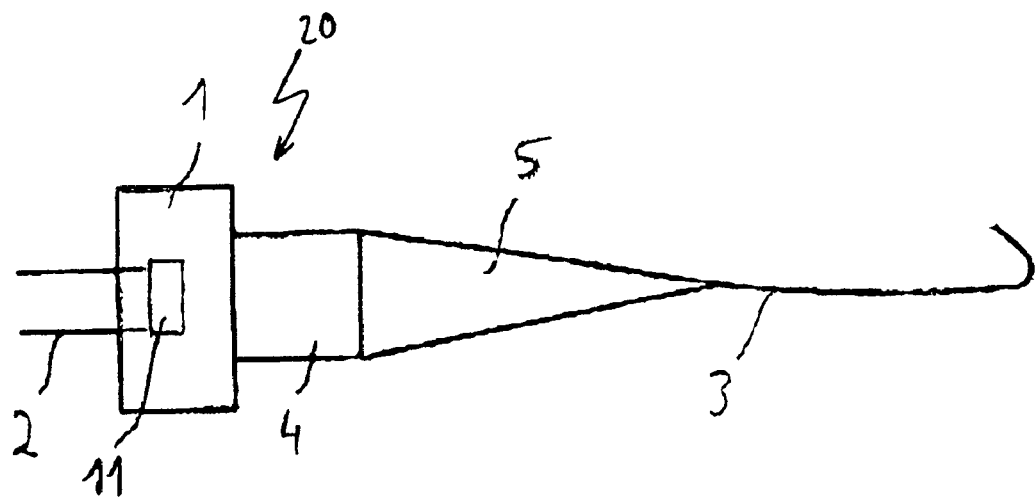
FIG. 3 is a diagrammatic view showing a prior-art optical device having an anti-kink protector.

An optical device generally marked by the reference number 20 having an anti-kink protector according to the prior art has already been explained at the beginning with reference to FIG. 3. Where the fiber 3 leaves the device 20 is an area 21.

Figure 1:
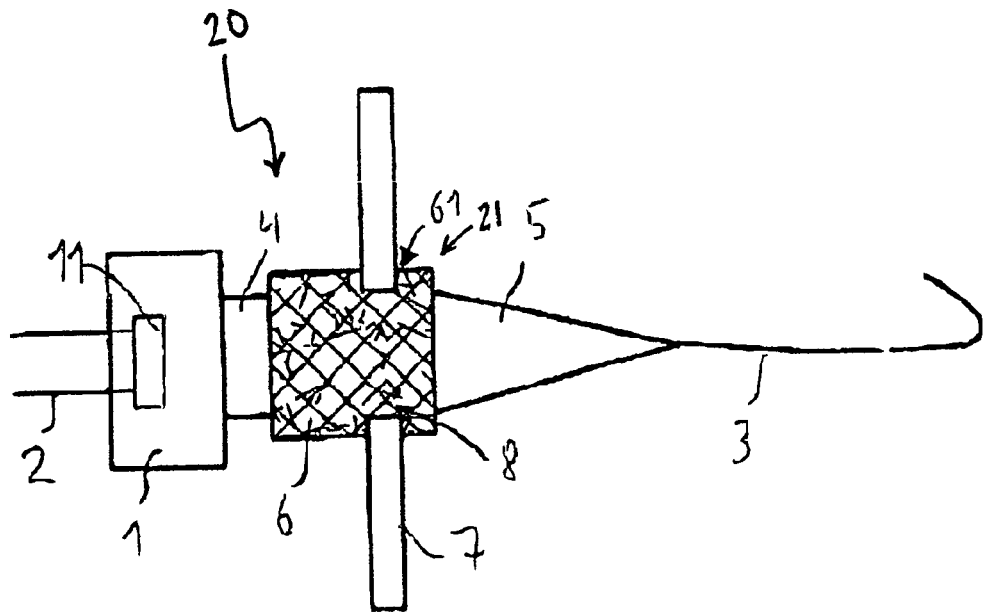
FIG. 1 is a diagrammatic view showing a first embodiment of an optical device having an anti-kink protector with electrically conductive sheathing.

Referring now to the figures of the drawings in detail and first, particularly to FIG. 1 thereof, there is shown a first exemplary embodiment of the invention with an optical device that has a transmitting and/or receiving device 11. The transmitting and/or receiving device 11 is disposed in a TO housing 1. The TO housing 1 has electric feed lines 2 to make contact with the transmitting and/or receiving device 11. The TO housing 1 is adjoined by a metallic adapter 4, into which a glass fiber 3 is adhesively bonded so as to be centered. A conically tapering anti-kink protective sleeve 5 protects the optical fiber 3 against mechanical stress.

Disposed on subareas of the anti-kink protective sleeve 5 and the metallic adapter 4 is cylindrical sheathing 6. The sheathing can also be referred to as a sleeve. The cylindrical sheathing includes an electrically conductive material. In this case, this is an elastic sleeve that includes a plastic filled homogeneously with conductive particles. The sleeve is pushed over the anti-kink protector 5 and the metallic adapter 4.

The sheathing 6 is electrically coupled to a module housing 7. The modular housing includes the TO housing 1 and further optical and/or electric components of a transmitting and/or receiving module. The sheathing 6 is in this case disposed in the area 21 of an outlet opening 8 of the module housing 7. This outlet opening 8 allows the optical fiber 3 to be led from the module housing. In order to provide reliable electrical contact between the area of the rim of the opening 8 of the module housing 7 and the electrically conductive sheathing 6, the sheathing 6 preferably has grooves 61, in which the opening rim of the module housing 7 engages.

In particular in the case in which the sheathing includes an elastic material. The sheathing can have a slightly greater diameter than the opening 8, so that in the area of the opening, the sheathing is pressed in somewhat by the latter.

By placing the conductive sleeve 6 at the location of the fiber leadthrough 8 through the metallic module housing 7, good electrical contact is produced between the metallic TO housing 1 of the transmitting or receiving module 11 and the module housing 7. Interference potentials produced during the operation of the transmitting or receiving module 11 are dissipated to the metallic module housing 7 by the electrical coupling.

The electrical bonding to the module housing 7 is particularly advantageous in this case because the bonding is in the immediate vicinity of the TO housing 1. In the case of a longer electrical connection, it would be necessary to expect that interference potentials would again be produced because of the low wavelengths of the emitted radiation.

In an alternative refinement of FIG. 1, the sheathing 6 extends, additionally or only, in the tapering area of the anti-kink protector 5. For example, an anti-kink protective sleeve including a conventional plastic is directly coated with a metal in this area. In this case, the sheathing 6 forms a conductive, tapering cylinder that, because of a chimney effect, reduces the output coupling of interference radiation sharply. For example, radiation emerging from the interior of the module housing 7 or the TO housing 1 cannot leave the cylinder. The outlet conditions for electromagnetic waves are made worse, and the cutoff frequency is increased. The chimney function is more highly marked the longer and the smaller in diameter the construction of the conductive part.

Figure 2:
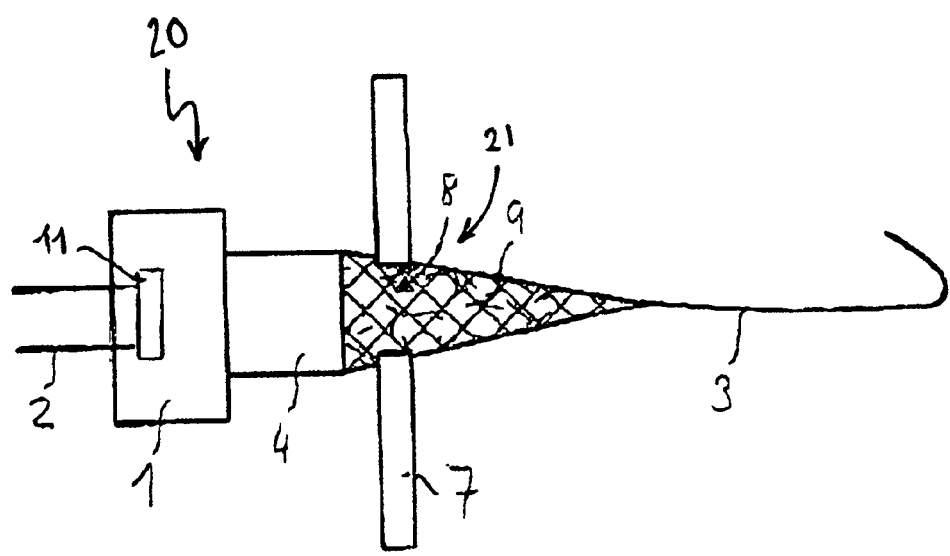
FIG. 2 is a diagrammatic view showing a second embodiment of an optical device having an anti-kink protector made of an electrically conductive material.

FIG. 2 shows an alternative exemplary embodiment that differs from the exemplary embodiment of FIG. 1 in that here the anti-kink protective sleeve 9 itself is made of an electrically conductive material. This is the preferred embodiment of the invention. Suitable materials for the anti-kink protective sleeve can be obtained, for example, from Thora Elektronik GmbH in 91567 Herrieden, under the designation "EMI EcE, Type 12".

Figure 4:
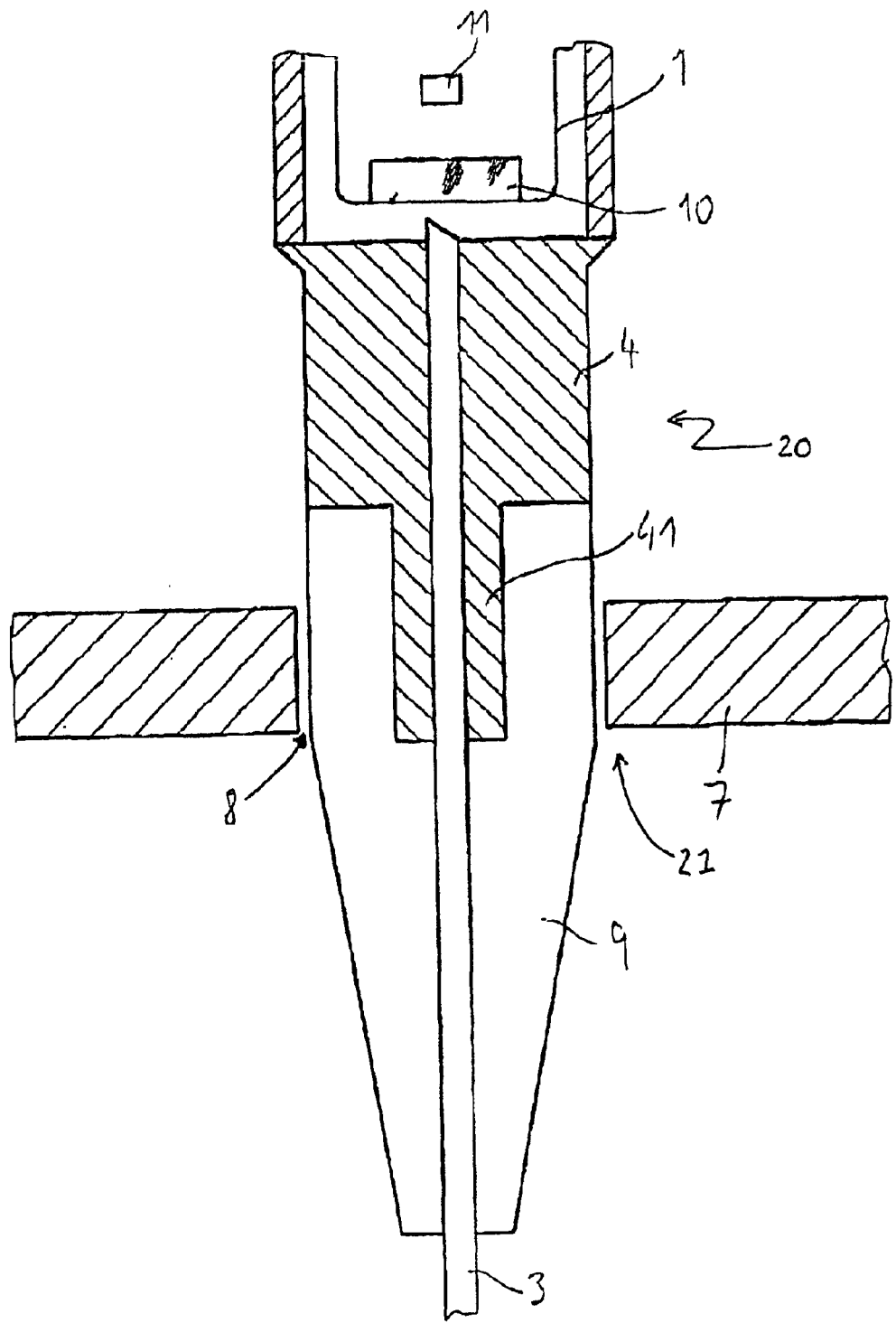
FIG. 4 is a sectional view through an optical device having an anti-kink protector made of electrically conductive material as shown in FIG. 2.

The configuration of FIG. 2 is shown in section in FIG. 4. In accordance with FIG. 4, the light from the transmitting or receiving device 11, which is a laser diode or a photodiode, for example, is coupled in to an optical fiber 3 that is bevelled at its end face. The transmitting or receiving device 11 is located, in a manner known per se, in a TO housing 1 which is merely indicated and has a light entry and light exit window 10 made of glass.

The TO housing 1 is adjoined by a metallic adapter 4 that has a cylindrical extension 41. Plugged onto the cylindrical extension 41 is the anti-kink protector 9. In this case, provision can likewise be made for the anti-kink protector 9 also to extend beyond the outer circumference of the adapter 4.

The anti-kink protector 9 includes an electrically conductive material that provides a connection with the rim of an opening 8 formed in a module housing 7. It is pointed out, that in FIG. 4, there is a small distance between the anti-kink protector 9 and the module housing 7. However, this is shown only for illustrative reasons. In actual fact, there is direct metallic contact between the anti-kink protector 9 and the module housing 7, as can be seen in FIGS. 1 and 2.

The anti-kink protective sleeve 9 is connected electrically both to the metallic adapter or the TO housing 1 and to the module housing 7, so that the TO housing 1 is bonded electrically to the module housing 7. The outlet opening 8 is filled completely by a metallically conductive material, so that the emission of electromagnetic radiation through the opening 8 is greatly reduced.

In further exemplary embodiments (not illustrated), the optical device, to which an optical fiber is coupled with the use of an anti-kink protector, is an optical connector that can be plugged in to the rear wall of a computer. Such a connector normally has metal parts that lead to interference radiation at high frequencies.

In the case of this variant of the invention, the anti-kink protector includes a material that is not conductive or only moderately conductive, in order that the anti-kink protector does not additionally act as an antenna. However, the material used for the anti-kink protector absorbs electromagnetic rays to a considerable extent. This leads to considerable attenuation of the interference radiation from the connector. Suitable materials that absorb electromagnetic radiation can be obtained, for example, from Cuming Microwave, Aron, Mass. 02322, USA, under the designation "C-RAM KRS" "C-RAM KFE".

Figure 5:
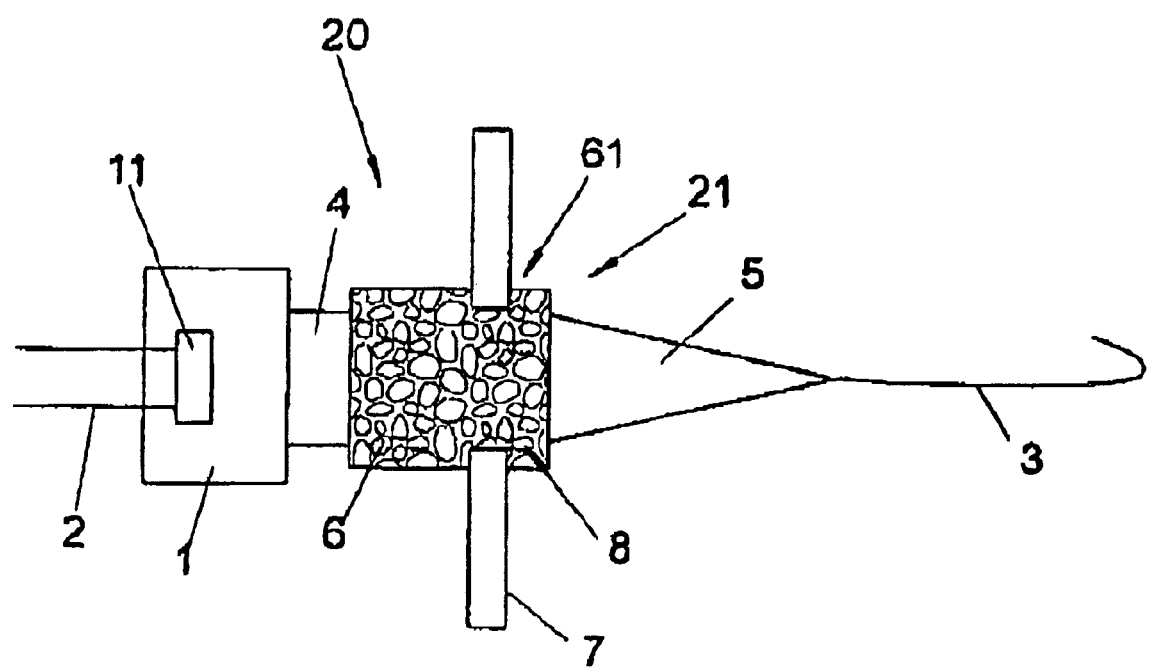
FIG. 5 is a diagrammatic view showing a third embodiment of an optical device having an anti-kink protector sheathed with a sleeve made of a material being highly absorbent to electromagnetic waves.

FIG. 5 shows another embodiment of the invention with an optical device 20 that differs from the exemplary embodiment of FIG. 1, in that, the anti-kink protector 5 is sheathed with a sleeve 6 made of a material that is highly absorbent to electromagnetic waves.

Figure 6A:
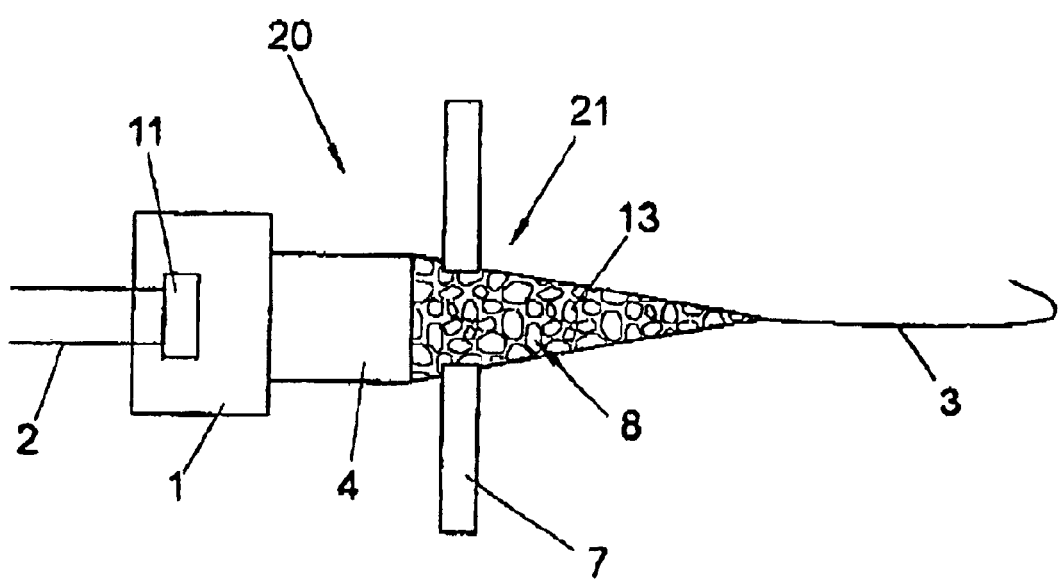
FIG. 6A is a diagrammatic view showing a fourth embodiment of an optical device having an anti-kink protector made of a material that is highly absorbent to electromagnetic waves.

FIG. 6A shows yet another embodiment of the invention with an optical device 20 that differs form the exemplary embodiment of FIG. 1, in that, the anti-kink protector 13 is made of a material that is highly absorbent to electromagnetic waves.

Figure 6B:
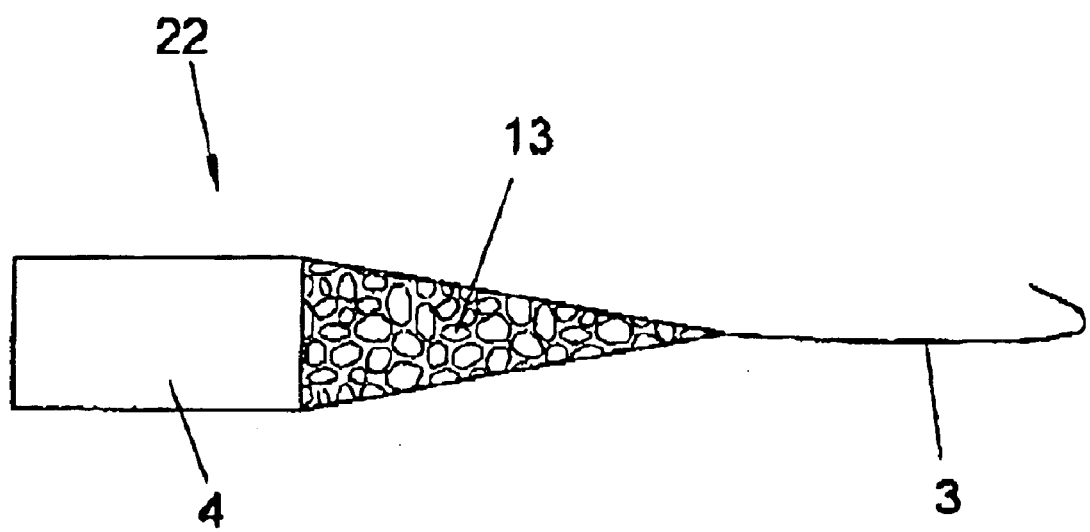
FIG. 6B is a diagrammatic view showing an alternate fourth embodiment of an optical connector as an optical device having an anti-kink protector made of a material that is highly absorbent to electromagnetic waves.

FIG. 6B depicts an alternative embodiment of the invention. In contrast to FIG. 6A, an optical connector 22 that is an optical device is shown with a metallic adapter 4 to be brought in contact with a suitable plug.

We claim:

1. An optical device assembly, comprising:
   an optical device having an area;
   an optical fiber led from said optical device through said area; and
   an anti-kink protector for said optical fiber being disposed in said area and made of an electrically conductive material.

2. The assembly according to claim 1, including a metallic structure belonging to said device and electrically contacting said electrically conductive material.

3. The assembly according to claim 2, including a metallic housing of said device accommodating an opto-electronic component said metallic housing being electrically coupled to said anti-kink protector.

4. The assembly according to claim 3, wherein said opto-electronic component is a TO (transistor outline) housing.

5. The assembly according to claim 1, wherein said anti-kink protector electrically contacts a reference potential.

6. The assembly according to claim 5, including a metallic housing coupled to said anti-kink protector.

7. The assembly according to claim 6, wherein said metallic housing is a module housing and surrounds said device.

8. The assembly according to claim 7, wherein:
   said metallic housing has an opening formed therein; and
   said anti-kink protector has circumferential grooves for fixing said anti-kink protector to said opening of said metallic housing.

9. The assembly according to claim 1, wherein said electrically conductive material is highly conductive.

10. The assembly according to claim 1, wherein:
    said optical device is an optical connector; and
    said anti-kink protector absorbs electromagnetic waves strongly.

11. An optical device assembly, comprising:
    an optical device having an area;
    an optical fiber led from said optical device through said area; and
    an anti-kink protector for said optical fiber being disposed in said area and made of a material being highly absorbent to electromagnetic waves.

12. The assembly according to claim 11, including a metallic housing of said device accommodating an opto-electronic component and coupling electrically to said anti-kink protector.

13. The assembly according to claim 11, wherein said optical device is a TO (Transistor Outline) housing.

14. The assembly according to claim 11, wherein said anti-kink protector electrically contacts a reference potential.

15. The device according to claim 14, including a metallic housing coupled to said anti-kink protector.

16. The assembly according to claim 15, wherein said metallic housing is a module housing and surrounds said device.

17. The assembly according to claim 15, wherein:
    said metallic housing has an opening formed therein; and
    said anti-kink protector has circumferential grooves for fixing said anti-kink protector to said opening of said metallic housing.

18. The assembly according to claim 11, wherein said material is highly conductive.

19. The assembly according to claim 11, wherein said material being highly absorbent to electromagnetic waves is a ferritic material.

20. The assembly according to claim 11, wherein:
said optical device is an optical connector; and
said material being highly absorbent to electromagnetic waves absorbs electromagnetic waves strongly.

21. An optical device assembly, comprising:
an optical device having an area;
an optical fiber led from said optical device through said area; and
an anti-kink protector for said optical fiber being disposed in said area and sheathed with an electrically conductive material.

22. The assembly according to claim 21, including a metallic structure belonging to said device and electrically contacting said electrically conductive material.

23. The assembly according to claim 22, including a metallic housing of said device accommodating an opto-electronic component, said housing being electrically coupled to said anti-kink protector.

24. The assembly according to claim 23, wherein said opto-electronic component is a TO (Transistor Outline) housing.

25. The assembly according to claim 21, wherein said electrically conductive material electrically contacts a reference potential.

26. The assembly according to claim 25, wherein said anti-kink protector is electrically coupled to a metallic housing.

27. The assembly according to claim 26, wherein said metallic housing is a module housing surrounding said device.

28. The device according to claim 26, wherein:
said metallic housing has an opening formed therein; and
said anti-kink protector has circumferential grooves formed therein for fixing said anti-kink protector to said opening of said metallic housing.

29. The assembly according to claim 25, wherein said sheathing is electrically coupled to a metallic housing.

30. The assembly according to claim 29, wherein said metallic housing is a module housing surrounding said device.

31. The assembly according to claim 29, wherein:
said metallic housing has an opening formed therein; and
said sheathing has circumferential grooves formed therein for fixing said anti-kink protector to said opening of said metallic housing.

32. The assembly according to claim 21, wherein:
said anti-kink protector has a tapering area; and
said sheathing sheathes said anti-kink protector at least in said tapering area.

33. The assembly according to claim 32, wherein said sheathing sheaths said anti-kink protector completely.

34. The assembly according to claim 21, wherein said anti-kink protector is made of an electrically conductive material.

35. The assembly according to claim 21, wherein said electrically conductive material is highly conductive.

36. The assembly according to claim 21, wherein:
said optical device is an optical connector, and
said anti-kink protector is formed by a material strongly absorbing electromagnetic waves.

37. An optical device assembly, comprising:
an optical device having an area;
an optical fiber led out of said optical device through said area; and
an anti-kink protector for said optical fiber being disposed in said area and sheathed with a sleeve being made of a material being highly absorbent to electromagnetic waves.

38. The assembly according to claim 37, including a metallic housing of said device accommodating an opto-electronic component, said metallic housing being electrically coupled to said anti-kink protector.

39. The assembly according to claim 38, wherein said opto-electronic component is a TO (Transistor Outline) housing.

40. The assembly according to claim 37, including a metallic housing of said device accommodating an opto-electronic component, said metallic housing being electrically coupled to said sheathing.

41. The assembly according to claim 40, wherein said optoelectronic component is a TO (Transistor Outline) housing.

42. The assembly according to claim 41, wherein:
said metallic housing has an opening formed therein; and
said sheathing has circumferential grooves formed therein for fixing said anti-kink protector to said opening of said metallic housing.

43. A module, comprising:
a metallic module housing having an opening for passing optical fibers therethrough; and
an optical device assembly including an optical device having an area, an optical fiber led from said optical device through said area, and an anti-kink protector for said optical fiber being disposed in said area and made of an electrically conductive material;
said anti-kink protector of said device being disposed in said opening of said module housing and coupled electrically to said module housing.

44. The module according to claim 43, wherein said optical device is a transmitting device.

45. The module according to claim 43, wherein said optical device is a receiving device.

46. The module according to claim 43, wherein said anti-kink protector electrically couples said optical device and said module housing.

47. A module, comprising:
a metallic module housing having an opening for passing optical fibers therethrough; and
an optical device assembly including an optical device having an area, an optical fiber led from said optical device through said area, an anti-kink protector for said optical fiber being disposed in said area and sheathed with an electrically conductive material;
said anti-kink protector of said device being disposed in said opening of said module housing and coupled electrically to said module housing.

48. The module according to claim 47, wherein said optical device is a transmitting device.

49. The module according to claim 47, wherein said optical device is a receiving device.

50. The module according to claim 47, wherein said anti-kink protector electrically couples said optical device and said module housing.

* * * * *